United States Patent
Kurotsu

(10) Patent No.: US 7,808,661 B2
(45) Date of Patent: Oct. 5, 2010

(54) PRINT CONTROLLING PROGRAM, PROCESS METHOD, RECORDING MEDIUM, INFORMATION PROCESSOR AND PRINTING SYSTEM

(75) Inventor: Noriyoshi Kurotsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1468 days.

(21) Appl. No.: 11/190,917

(22) Filed: Jul. 28, 2005

(65) Prior Publication Data

US 2006/0023255 A1    Feb. 2, 2006

(30) Foreign Application Priority Data

Jul. 29, 2004    (JP) .............................. 2004-221837

(51) Int. Cl.
G06F 15/00 (2006.01)
G06K 1/00 (2006.01)
G06K 15/00 (2006.01)
G06F 3/12 (2006.01)

(52) U.S. Cl. ...................................... 358/1.14; 358/1.15

(58) Field of Classification Search ....... 358/1.13–1.18; 709/223

See application file for complete search history.

(56) References Cited

U.S. PATENT DOCUMENTS

| | | | | |
|---|---|---|---|---|
| 6,965,931 B2 * | 11/2005 | Helms | ........................ | 709/223 |
| 7,265,860 B2 * | 9/2007 | Ferlitsch | .................... | 358/1.15 |
| 7,321,434 B2 * | 1/2008 | Hayasaki | ................... | 358/1.13 |
| 2004/0156069 A1 | 8/2004 | Kurotsu et al. | ............. | 358/1.13 |
| 2004/0160613 A1 | 8/2004 | Kurotsu et al. | ............... | 358/1.1 |
| 2005/0007618 A1 * | 1/2005 | Thomason | ................. | 358/1.14 |

* cited by examiner

Primary Examiner—Douglas Q Tran
(74) Attorney, Agent, or Firm—Fitzpatrick, Cella, Harper & Scinto

(57) ABSTRACT

An object is to provide a scheme that holds back loads born by a print controlling apparatus capable of communication with an information processor, secure a constant level of usability related to printing by users and can establish a highly reliable printing system. With a scheme in an information processor including an issuing unit for issuing a request for process to a print controlling apparatus, a load is calculated for each of a number of requests that have been issued from the information processor but have received no response from the print controlling apparatus, and issuance of requests from the information processor is restrained based on the calculated loads.

10 Claims, 17 Drawing Sheets

FIG. 10

| | API | REQUESTID | STATUS | LOAD | PARAMETER |
|---|---|---|---|---|---|
| 1001 | (1) | 100 | SENT 1 WAIT EVENT | 2 | DEVICE STATUS CHANGE |
| 1002 | (1) | 101 | SENT | 2 | JOB STATUS CHANGE |
| 1003 | (3) | 102 | WAIT | 10 | START=1, COUNT=100 |
| 1004 | (4) | 103 | WAIT | 1 | NONE |
| 1005 | (5) | 104 | WAIT | 1 | JOBID=32 |
| 1006 | (4) | 105 | WAIT | 1 | NONE |

610

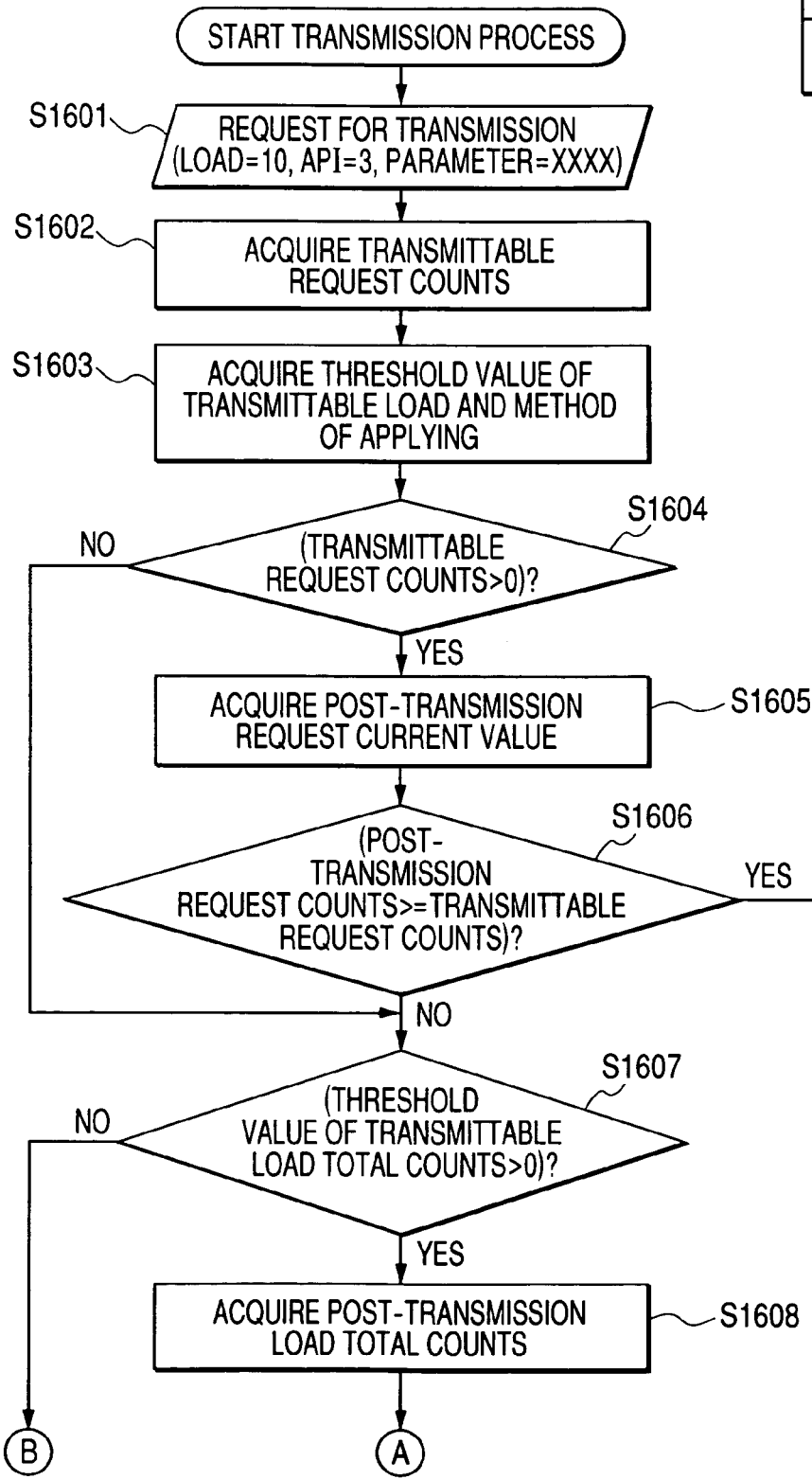

PRINT CONTROLLING PROGRAM, PROCESS METHOD, RECORDING MEDIUM, INFORMATION PROCESSOR AND PRINTING SYSTEM

BACKGROUND OF THE INVENTION

1. Field of the Invention

The present invention relates to a scheme capable of alleviating load born by a print server utilized in a printing system while leaving constant usability of the printing system of a client maintainable.

2. Related Background Art

In conventionally known printing systems, such a form utilizing a print server is implemented generally. In addition, in order to stabilize a printing system, it is desired to alleviate the load to be born by a print server. In addition, technology for alleviating process load of a print server is known.

According to this technology, a printing system has been disclosed and comprises a print server and a client computer (called as "client") so as to count the number of requests from the client with the print server, set the number of the requests to a predetermined limited number, to notify the client in case of more than the limited number that the request is not acceptable and to keep process loads of the server in control.

However, according to the above described technology, in the printing system, the print server determines whether or not to accept the requests from the client, giving rise to, therefore, a problem that the other clients will not be able to utilize the print server in the case where a client issues a great number of requests.

Moreover, even in case of rejecting the requests from clients, as the number of clients increases and requests will become abundant, the loads for processing the rejection of the print sever will increase, giving rise to a problem that the print server will incur many loads for processes which are not the original objects.

On the other hand, employment of respective highly value added functions into a print server has resulted in assumption of requests for various kinds of processes from clients, having brought about further necessity for alleviating the loads born by the print server appropriately.

In the case where the print server simply monitors the number of fluctuating requests which is taken as a parameter to determine whether or not to accept the requests, even when to calculate the same total loads of ten requests, types of those requests bring about big differences on process loads of the print server, giving rise to a problem that it is not at all an appropriate load assessment.

In addition, as a result of problems as described above, there is a problem that operations of the print server will become unstable and will become a less reliable printing system.

An object of the present invention is to provide a scheme that holds back loads born by a print controlling apparatus capable of communication with an information processor, secure a constant level of usability related to printing by users and can establish a highly reliable printing system.

SUMMARY OF THE INVENTION

Accordingly, the present invention is conceived as a response to the above-described disadvantages of the conventional art.

According to one aspect of the present invention, preferably, with a scheme in an information processor comprising an issuing means for issuing a request for process to a print controlling apparatus, load is calculated for each of a number of requests that have been issued from the information processor to the print controlling apparatus but have received no response from the print controlling apparatus, and issuance of requests from the information processor is restrained based on the calculated total loads. Thereby, holding back loads born by a print controlling apparatus capable of communication with an information processor, a constant level of usability related to printing by users can be secured and a highly reliable printing system can be established.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 10 is a table exemplifying the request managing table 610 having been shown in FIGS. 6A and 6B;

DESCRIPTION OF THE PREFERRED EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

With reference to the accompanied drawings, preferable embodiment of the present invention will be described as follows.

Figure 1:
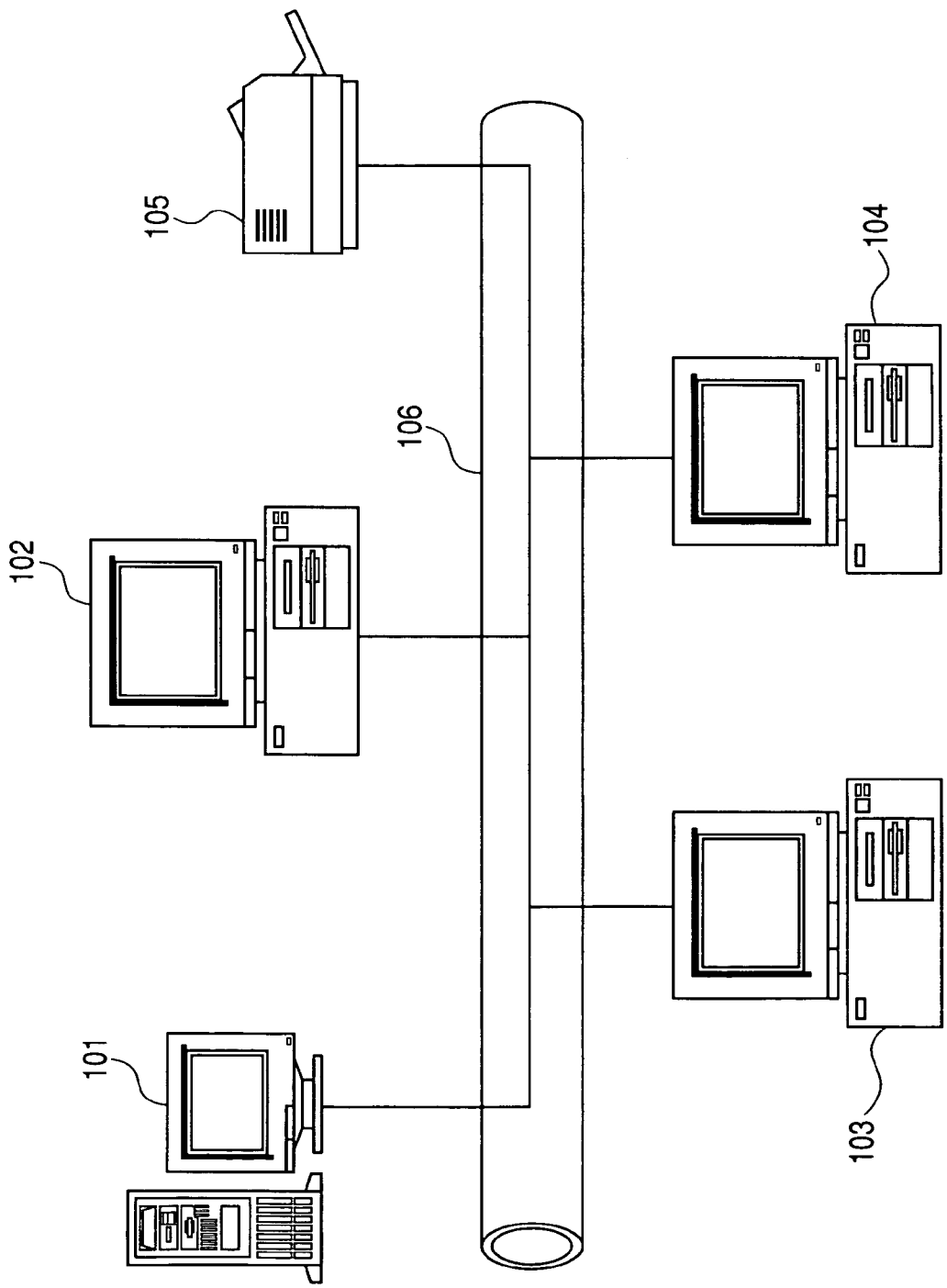
FIG. 1 is a block diagram showing a configuration of an information processing system of the present invention.

FIG. 1 is a block diagram describing a configuration of an information processing system to which the present invention is applicable. Here, it is assumed that one or a plurality of client computers are brought into connection with the present system.

In FIG. 1, reference numerals 102, 103 and 104 denote information processors as client computers (clients) which are brought into connection with a network 106 with network cables such as Ethernet™ and the like. Each client apparatus 102 to 104 is capable of executing respective types of programs such as application program and the like, and comprises a printer driver mounted and having functions to convert print data into a printer language corresponding to the printer. Reference numeral 101 denotes a server (hereinafter to be referred to as "print server") of the present embodiment, which is brought into connection with the network 106 with a network cable. The print server 101 functions as a print controlling apparatus, storing data for printing to be transmitted to the network printer 105, monitoring the usage status of the network 106, managing a plurality of printers brought into connection with the network 106 and implementing a scheduling process on print jobs as described in FIGS. 6A and 6B to be described below.

Here, the clients 102 to 104 and the print server 101 can be configured by storing the print controlling program into general information processors in an executable fashion so as to proceed with different controls individually.

In addition, in case of using general information processor as the print server 101, it can be provided with function of clients 102 to 104 at the same time. The print server 101 in the present embodiment further comprises functions as a print controlling apparatus, storing a print job containing print data outputted from the clients 102, 103 and 104 to make the printer print; or receiving a print job not containing print data from the clients 102, 103 and 104, managing the print order of the clients 102, 103 and 104, and notifying the client in turn of printing of permission of transmission of the print job containing print data; and acquiring status of the network printer 105 or respective types of information on a print job to notify the clients 102, 103 and 104 thereof and the like.

Reference numeral 105 denotes a network printer, which is brought into connection with the network 106 via a not shown network interface. The network printer 105 analyzes the print job containing print data transmitted from the client computers 102 to 104 to convert it into a dot image page by page, and implements printing page by page. In addition, the network printer 105 is capable of providing the print server 101 or the clients 102 to 104 with functions of managing print jobs ruled by ISO10175 (DPA: Document Printing Application).

In addition, the network printer 105 or the network interface card thereof may be configured to have functions implemented by the print server 101 or partial server function thereof. That is, the print server 101 to be described below will not be limited to the separate mode other than the network printer 105 as in FIG. 1 in particular, but may be a part of the network printer 105 (network interface card).

Reference numeral 106 denotes a network, which brings the clients 102, 103 and 104, the server 101, the network printer 105 and the like into connection and may be wireless or cabled.

In addition, the drawing shows only one network printer 105, but actually, a plurality of network printers may be brought into connection. Moreover, this network printer 105 is equivalent to a device 614 to be described later, and it goes without saying that image forming apparatuses in various types of recording systems selected from the group consisting of laser beam printers in an electrophotographic system/photocopiers/digital complex machines/facsimiles, printers in ink-jet system/digital complex machines and the like are applicable to this device 614.

Figure 2:
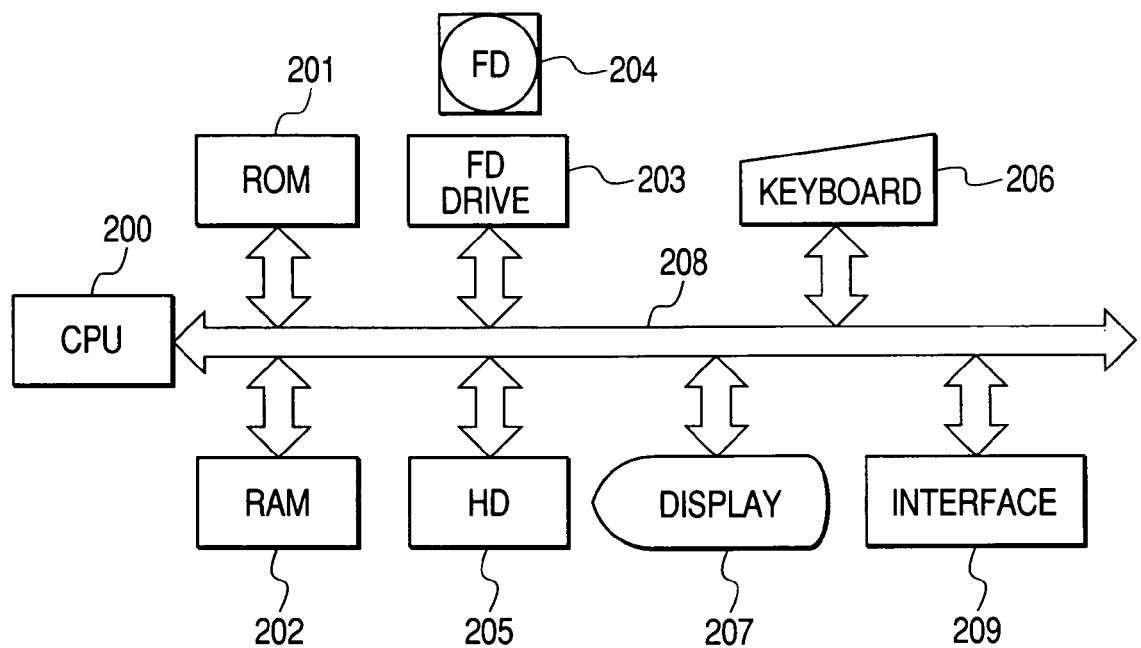
FIG. 2 is a block diagram describing a configuration of the information processor shown in FIG. 1.

FIG. 2 is a block diagram describing a configuration of the information processor utilizable to the clients 102 to 104 and the print server 101 in the present embodiment. As described above, the clients 102, 103 and 104 as well as the print server 101 are realizable by an information processor having likewise hardware configurations. FIG. 2 will be described as a block diagram describing a configuration of clients and a server as follows.

In FIG. 2, reference numeral 200 denotes a CPU being control means of the information processor for executing application programs stored in a hard disk (HD) 205, a printer driver program, the OS or a network printer control program of the present invention and the like and for controlling to temporarily store into a RAM 202 the information necessary for executing the programs and files, etc.

Figure 5:
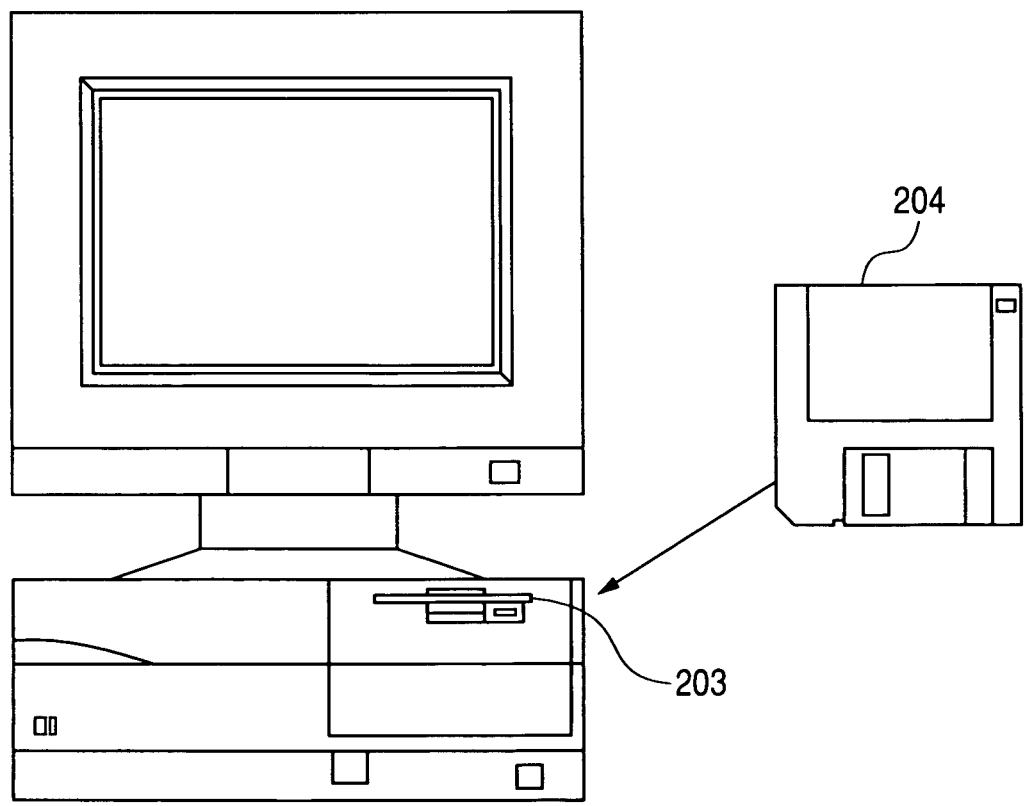
FIG. 5 is a pictorial diagram showing the relationship with the FD drive 203 and the FD 204 which is inserted to the FD drive 203.

Reference numeral 201 denotes a ROM, which stores inside it programs such as basic I/O program and the like, font data used at the time of document processing and respective types of data such as data for templates and the like. Reference numeral 202 denotes a RAM for providing temporary storage means, which functions as the main memory of the CPU 200, the work area and the like. Reference numeral 203 denotes a flexible disk (FD) drive, which can load programs stored in the FD 204 as storage media via a FD drive 203 as shown in FIG. 5 to be described later and the like onto the present computer system. Reference numeral 204 denotes a flexible disk (FD) as storage media being storage media where computer readable programs are stored. Here, as storage media, without being limited to the FD, any media such as a CD-ROM, a CD-R, a CD-RW, a PC card, a DVD, an IC memory card, an MO, a memory stick and the like can be utilized.

Reference numeral 205 denotes one external storage apparatus, which is a hard disk functioning as a large capacity memory. In the HD 205, application programs, a printer driver program, the OS, a network printer controlling program, related programs and the like are stored. In addition, the spooler being spool means is secured in this HD 205. Here, the spool means refer to a client spooler for the clients 102 to 104, and a server spooler for the print server 101. In addition, the print server 101 stores job information in receipt from the clients 102 to 104, and a table for implementing order control is generated and stored in this exterior storage apparatus (HD 205) as well.

Reference numeral 206 denotes a keyboard for inputting instructions. Using the keyboard 206, the user inputs and instructs to the client computer or an operator or a manager do to the print server an order of control commands of a device and the like. Here, in order to implement instruction and inputting, a pointing device (not shown) may be provided.

Reference numeral 207 denotes a display, which displays commands inputted from the keyboard 206, the status of the printer and the like. Reference numeral 208 denotes a system bus, which governs the data flow inside the computer being a client and the print server. Reference numeral 209 denotes an interface, and via the interface 209, the information processor is brought into connection with the network 106, which will enable exchange of data with external apparatuses.

Figure 3:
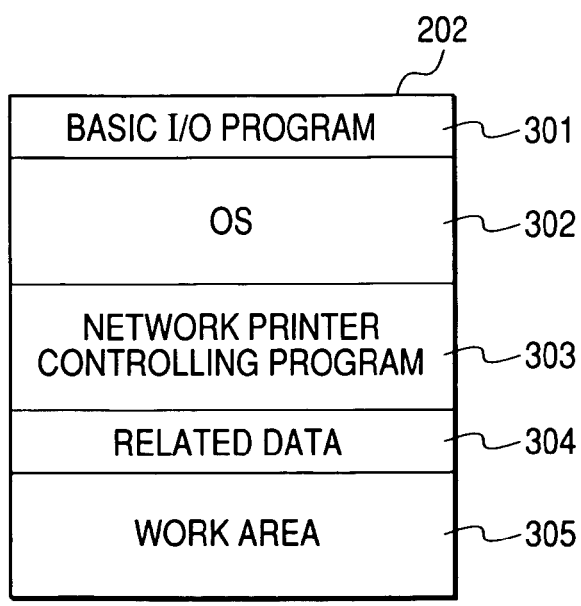
FIG. 3 is a table exemplifying a memory map of the RAM 202 shown in FIG. 2.

FIG. 3 exemplifies the memory map of the RAM 202 shown in FIG. 2. FIG. 3 shows the memory map under the state that the above described network printer controlling program stored in the FD 204 is loaded onto the RAM 202 and has become executable.

The present embodiment exemplifies loading of the network printer controlling program as well as the related data directly to the RAM 202 from the FD 204 for execution, but otherwise each time the FD 204 operates the network printer controlling program, loading may be arranged to be implemented from the HD 205 where the network printer controlling program is already installed to the RAM 202. In addition, the media storing the present network printer controlling program may be a CD-ROM, a CD-R, a PC card, a DVD, an IC memory card and the like other than the FD. Moreover, it is possible that the present network printer controlling program is stored in the ROM 201 and this is configured to become a part of the memory map so that the CPU 200 implements execution directly. In addition, the software for realizing the function equivalent to the above described respective apparatuses can be configured as a replacement of the hardware apparatuses.

In addition, the present network printer controlling program is occasionally called as a print controlling program simply. The print controlling program includes programs for controlling instruction for changing the printing site of the print job in the clients 102 to 104 and instruction for changing the print order. In addition, the print controlling program includes in the print server 101 programs for controlling order of print jobs and notifying print finalization of a print job or a request for a change in printing site and the like. In addition, for the print controlling program of the present embodiment to control like this, modules to be installed into the clients 102 to 104 and modules to be installed into the print server 101 may be divided separately. Or one print controlling program may function as the one for a client depending on the circumstances of execution, or function as the one for the print server. Or one computer can be configured to operate simultaneously or in a time-shared pseudo-parallel fashion by installation of both the modules having functions for a client and the modules to function as a print server.

In FIG. 3, reference numeral 301 denotes a basic I/O program, which is read by the OS from the HD 205 to the RAM 202 when the power of the present controlling apparatus is switched ON and is a region where the programs having an IPL (initial program loading) function to start the operation of the OS and the like are present. Reference numeral 302 denotes an operating system (OS) and reference numeral 303 denotes a network printer controlling program, both of which are stored in the respective regions secured in the RAM 202. Reference numeral 304 denotes the related data, which are stored in a region secured in the RAM 202. Reference numeral 305 denotes a work area, where a work region is secured to be used at the time when the CPU 200 executes the printer controlling program (303) and the like.

Figure 4:
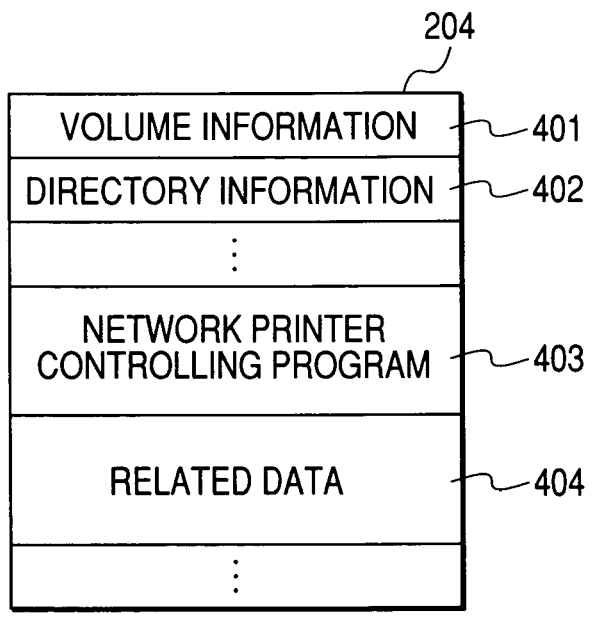
FIG. 4 is a table exemplifying a memory map of the FD 204 shown in FIG. 2.

FIG. 4 is a table exemplifying a memory map of the FD 204 shown in FIG. 2. In FIG. 4, reference numeral 400 denotes data contents of the above described FD 204, reference numeral 401 denotes volume information showing data information, reference numeral 402 denotes directory information, reference numeral 403 denotes a network printer controlling program being a print controlling program describing the present embodiment, and reference numeral 404 denotes the related data thereof. The network printer controlling program numbered 403 has been programmed based on the flow chart described in the embodiment, and in the present embodiment, the clients and the server are configured likewise.

FIG. 5 is a pictorial diagram showing the relationship with the FD drive 203 and the FD 204 which is inserted to the FD drive 203, and the same code is given to the corresponding component in FIG. 2. In FIG. 5, the network printer print controlling program as well as the related data described in the present embodiment as described in FIG. 4 are stored in the FD 204.

Next, the print controlling process to operate based on the respective configurations having been described above will be described.

Figure 6A:
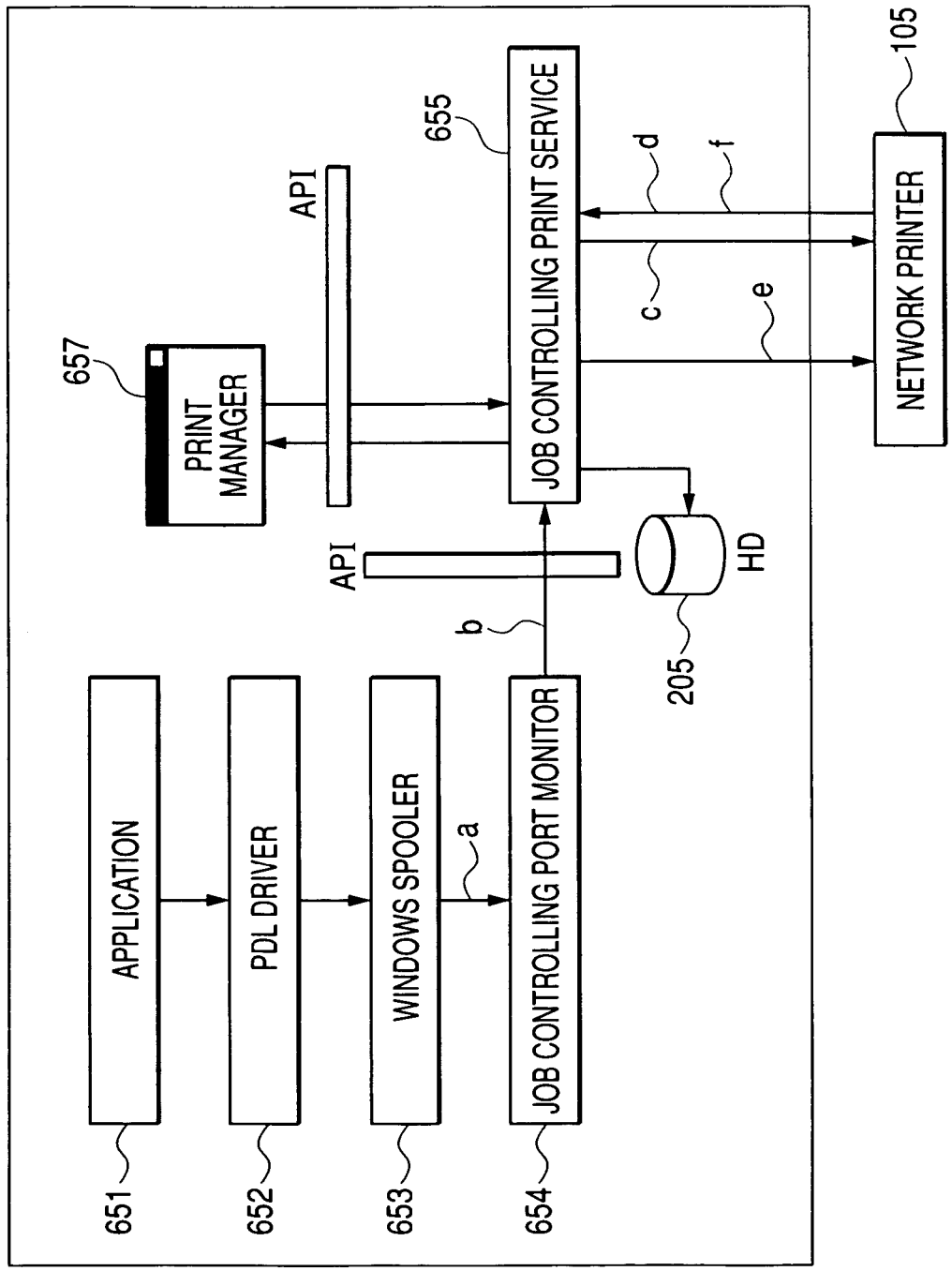
FIGS. 6A and 6B are schematic diagrams showing functions of a printing system of the present invention.

Next, an example of software configuration for transmitting a print job to the network printer 105 of a client of the present printing system will be described. FIG. 6A is a schematic diagram exemplifying a software configuration in the clients 102 to 104. Arrows between respective components shows how a print job including a draw command having been issued from the application undergoes processing. In addition, the software configuration shown in each block is executed by the CPU 200 in FIG. 2 to realize the desired functions.

Normally, a general application program 651 such as Microsoft Word™ accepts instruction of printing, and then generates a series of draw command via the OS. The PDL driver 652 in receipt of the draw command generated via the OS generates a print job including a PDL file so that the network printer 105 can interpret the generated print job based on the series of draw command. Here, in the following description, a PDL drive will be taken as an example for description, but without being limited hereto, it goes without saying that, for example, BDL (Band description Language), a printer driver producing a compressed bit map or a mode to generate print data with an application as well as an OS but not via printer driver are applicable.

The PDL drier 652 delivers a print job to a spooler 653 to transmit to a print device.

Here, an OS is assumed to be Windows™ and therefore the spooler 653 is a Windows™ spooler. However, the OS of the computer to which the present invention is applied will not be limited to Windows™, but it goes without saying that another OS is applicable if it comprises a draw command.

The spooler 653 delivers the print job to a port monitor 654 that a user has selected and instructed via the user interface and takes a procedure to have it transmitted to the print device such as the network printer 105 and the like (the arrow a).

Here, the description will be continued in the assumption that the user has designated a port monitor 654 (hereinafter to be abbreviated as "job controlling port monitor") which is set to transfer the print data to a job controlling print service 655 in advance to instruct printing.

In addition, print setting information such as paper sizes set via the printer driver interface, staple instruction and the like are transmitted to the job controlling port monitor 654 as well. The job controlling port monitor 654 transmits it to a print service 655 (called as "job controlling print service") (the arrow b).

The job controlling print service 655 comprises functions for managing the transmitted print jobs as well as the status of devices. In addition, it also comprises functions of managing information such as device status notified from the print devices or job status and the like, and in addition, making a predetermined order to the print devices. This is equivalent to functions for managing device information and job information on a plurality of not shown network printers including the network printer 105.

In addition, prior to transmission of the print data to the network printer 105, it issues a request for print to the print job order managing function which the network printer 105 has (the arrow c), and, in case of arrival of turn based on the order managing function, transmits (the arrow e) the print data to the network printer 105 in response to the print instruction from the print controlling apparatus (network printer 105 or the print server 101) (the arrow d).

Upon confirmation of finalization of the print data, the network printer 105 notifies (the arrow f) the job controlling print service 655 of print finalization, and notifies (the arrow f) of the status of the network printer 105.

The print manager 657 is a program for providing the user interface for a user to check in which state a print job is inside the job controlling print service 655 or to operate the print job. The print manager 657 exchanges information and instruction with the job controlling print service 655 via the interface (API: Application Program Interface) of the software of the job controlling print service 655.

In addition, it comprises a function of acquiring as an event the status information of the network printer 105 which the job controlling print service 655 manages. As types of event notification, warning that the remaining amount of toner has become less, communication disorder with the clients and the device, memory shortage, notification of error/warning information that the discharge tray is full, notification of normal information that the normal state has come back from an error state and the like are assumed. The job controlling print service 655 here comprises a function of accepting notification of status such as middle of print execution of respective devices (print apparatuses) communicable via network, the power controlling state, failure information (paper jam) and the like.

Figure 6B:
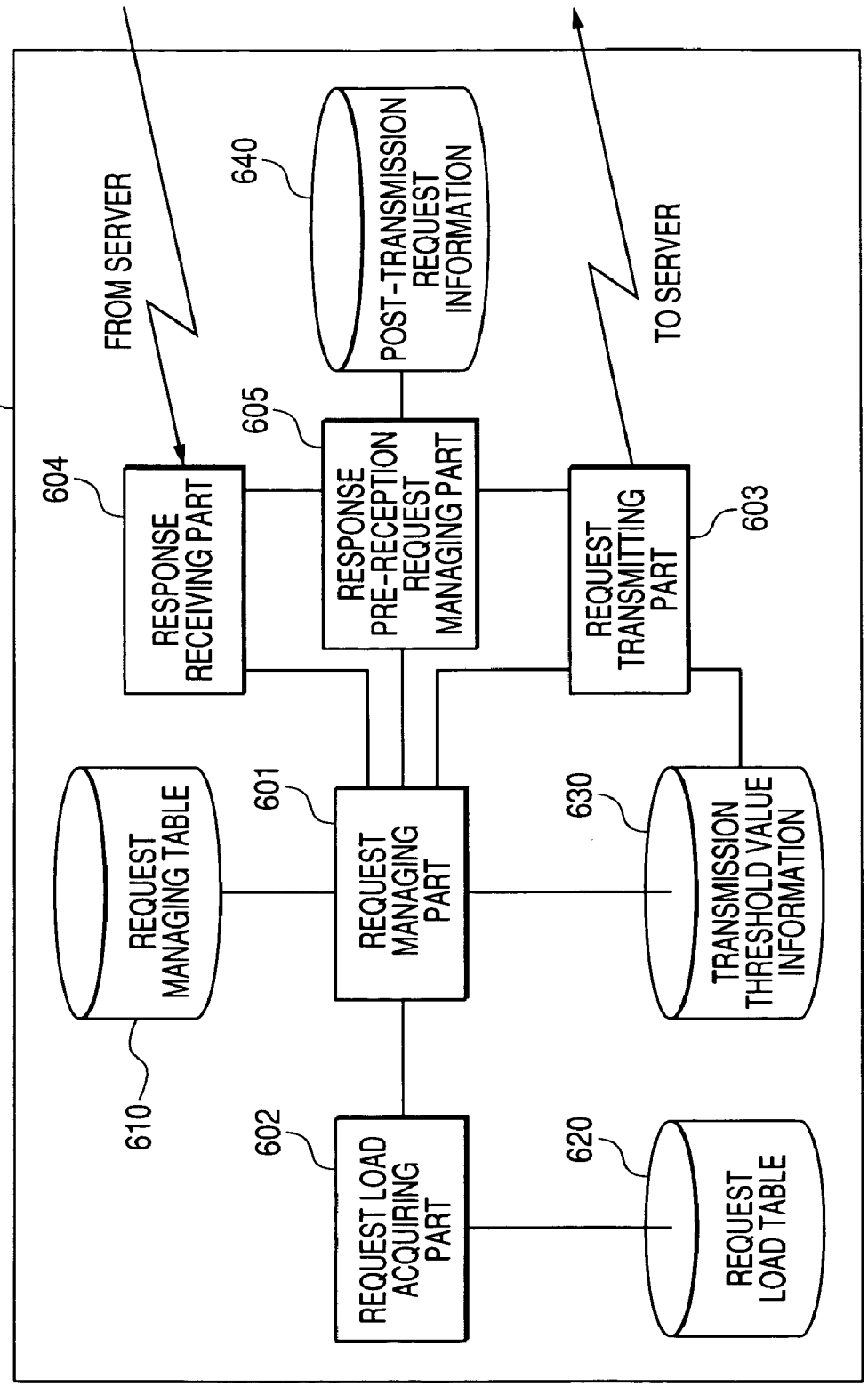

FIG. 6B is a block diagram showing a controlling program 303 on an information processor to which the present invention has been applied as well as the logical structure of the related data 304, and is equivalent to a drawing to show a part of functions of the job controlling print service 655.

In FIG. 6B, reference numeral 601 denotes a request managing part, which manages requests to be transmitted to the server and requests already transmitted to the server waiting for a response in an identifiable fashion with managing information in FIG. 10 to be described later. Reference numeral 602 denotes a request load acquiring part, which has a function of determining a load corresponding with respective requests in accordance with instruction from the request managing part 601.

Reference numeral 620 denotes a request load table, which provides data for determining a load corresponding with respective requests. The method of the request load acquiring part 602 to determine (identify) a load value corresponding with a request with the request load table 620 will be described later with reference to FIG. 8.

Reference numeral 603 denotes a request transmitting part. Actually, a socket library of the OS is called, and thereafter, the data of request are sent from a communication controlling part such as a network card. In any of the present embodiment, "transmission of request" will indicate a process of causing the above described socket library and the communication controlling part to transmit a request.

Figure 9:
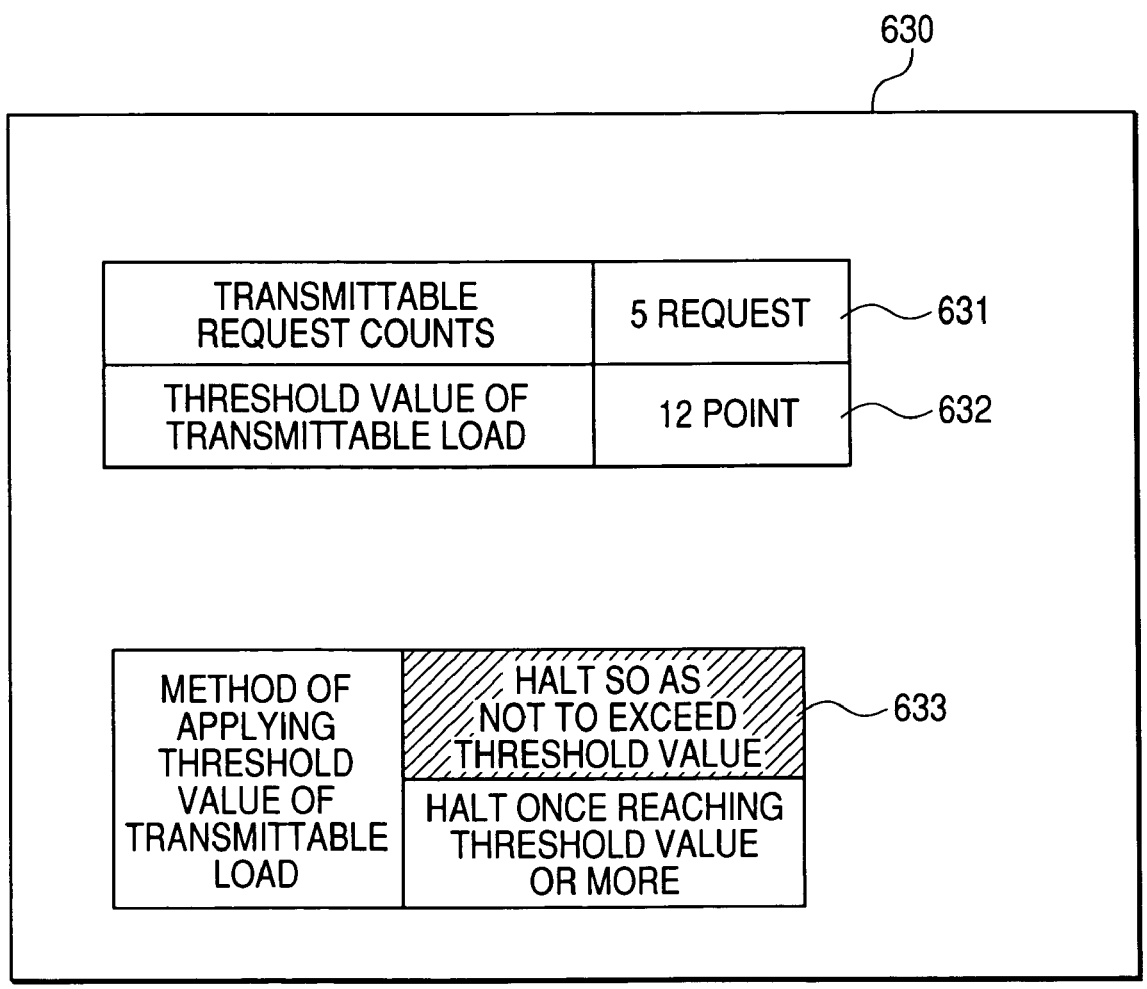
FIG. 9 is a table exemplifying transmission threshold value information 630 having been shown in FIGS. 6A and 6B.

In addition, the present embodiment has a function of managing a list of request transmitted to the server and waiting for a response as post-transmission request information 640 (to be described later with reference to FIG. 11), and halting, that is, restraining transmission to the server or resuming the restrained transmission of request in accordance with these request counts or their total loads, the threshold values stored in the transmission threshold value information 630 as well as their applying conditions (to be described later with reference to FIG. 9). Details will be described later with reference to FIGS. 16A and 16B to FIG. 19.

Here, restraining process will be described with the term "halt" hereunder. This "halt" includes various processes to arrange a request so as not to be transmitted as a result, such as a concept of giving up transmission in case of an attempt to transmit, a concept of refraining from transmission itself from the start and the like. Reference numeral 604 denotes a response receiving part, which has function to receive a response from the server or an event notification, renew the post-transmission request information 640 and dispatch the data in receipt to the request managing part 601. This will be described later with reference to FIG. 18 and FIG. 19.

Figure 7:
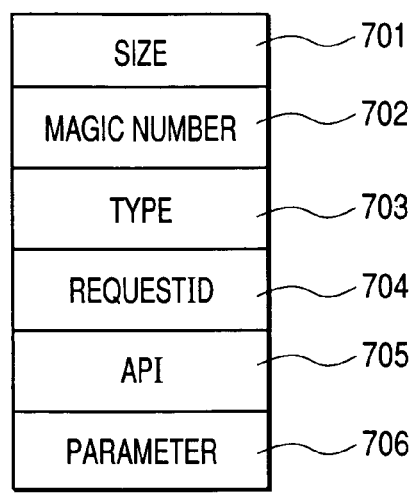
FIG. 7 is a table exemplifying a configuration of message transmitted and received between the client 102 having been shown in FIG. 1 and the server computer 101 or the server program in the network printer 105.

FIG. 7 is a table exemplifying a format of message exchanged between the clients 102 to 104 and the print server 101 or the network printer 105 in the information processing system of the present invention, showing requests specifically.

In the drawing, size 701 defines the sizes of a message in its entirety. Magic number 702 is utilized for identifying services at such a time of receiving a message in error. Type 703 spells out message types. In the embodiment of the present invention, at least two types, that is, "request" and "response" will work well, but "event" and the other types may be added.

Here, "request" is a message for a client to ask the print server for a process, while "response" is a message of sending back the consequence of the process by the print server in accordance with the above described request.

"Event" is a message for notifying a client from the print server on a non-synchronized fashion of changes of information that the print server manages. RequestID 704 is an ID admitted on all requests issued from each client in an identifiable fashion respectively and is utilized to be brought into corresponding with a corresponding "request" at the time of receiving "response" or "event".

Api 705 is an identifier for showing specific contents (command) of process such as a request for response on status to the network printer 105, and the process to be executed in accordance with this number should be agreed between the clients and the print server in advance. Parameter 706 is a region where to store arguments and responded data corresponding with the contents (command) of process, and is formatted on each api so that the contents thereof is different on each message.

Figure 8:
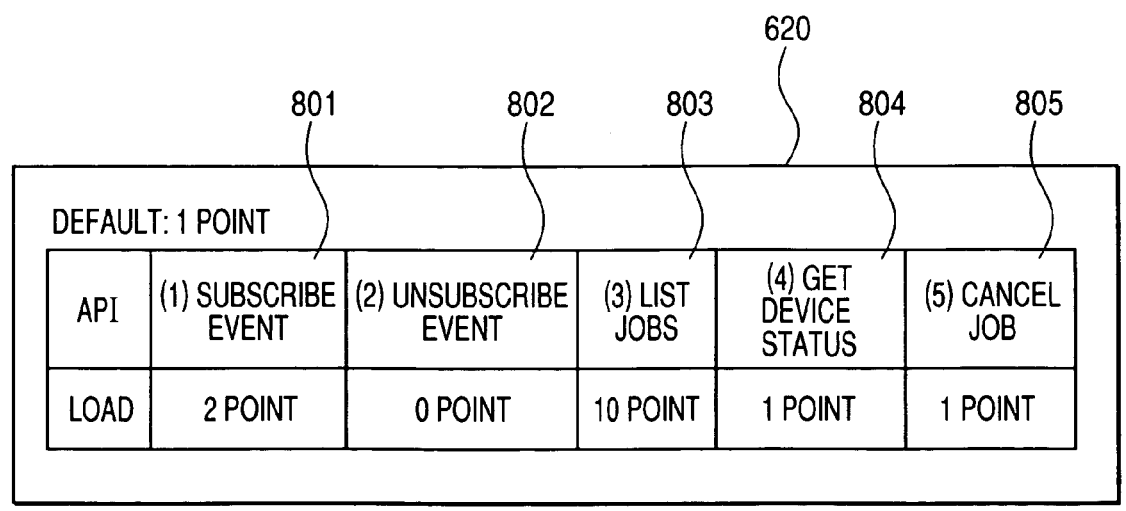
FIG. 8 is a table exemplifying a request load table 620 having been shown in FIG. 6.
Figure 12:
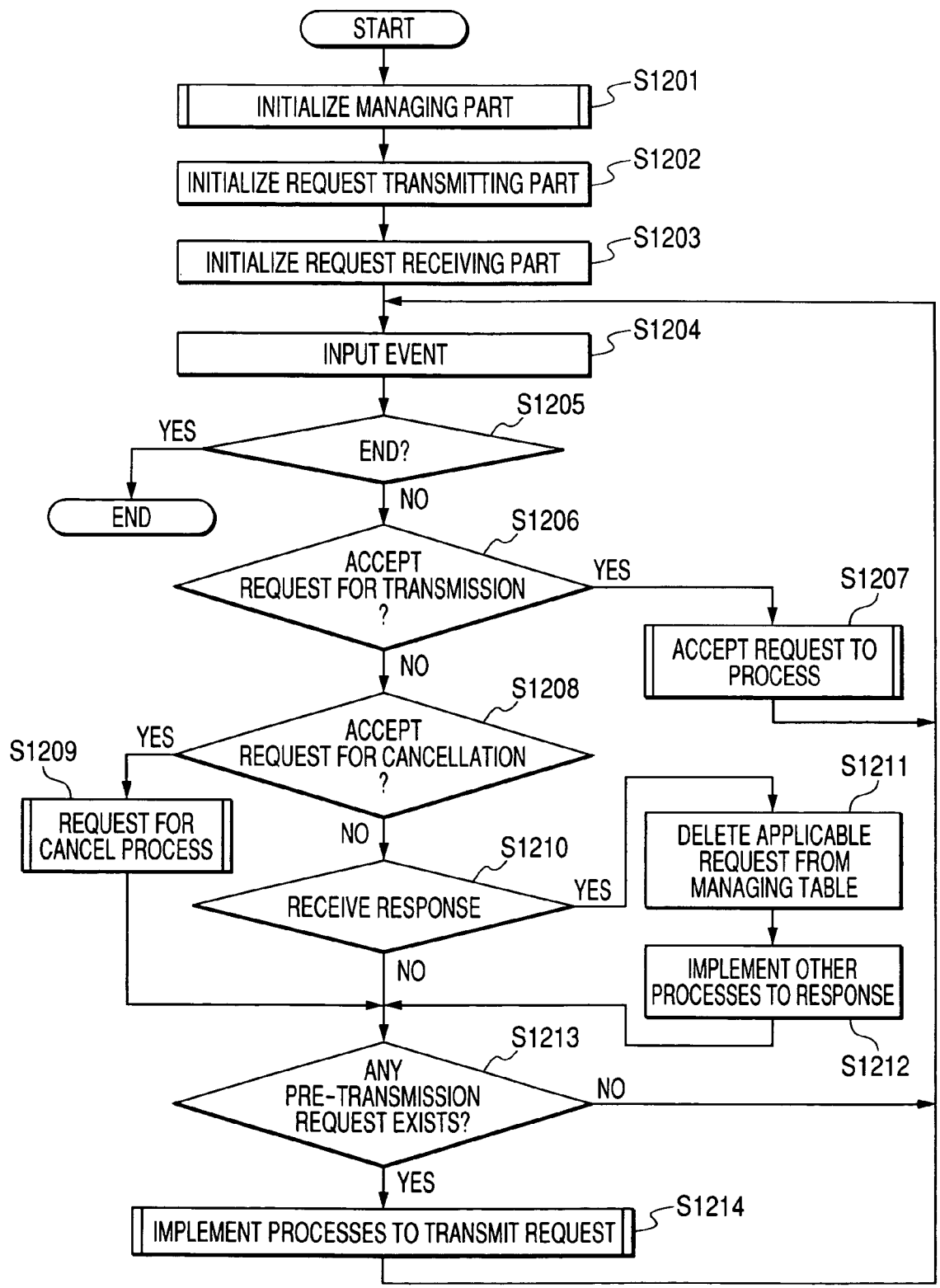
FIG. 12 is a flow chart exemplifying a request transmission process.
Figure 13:
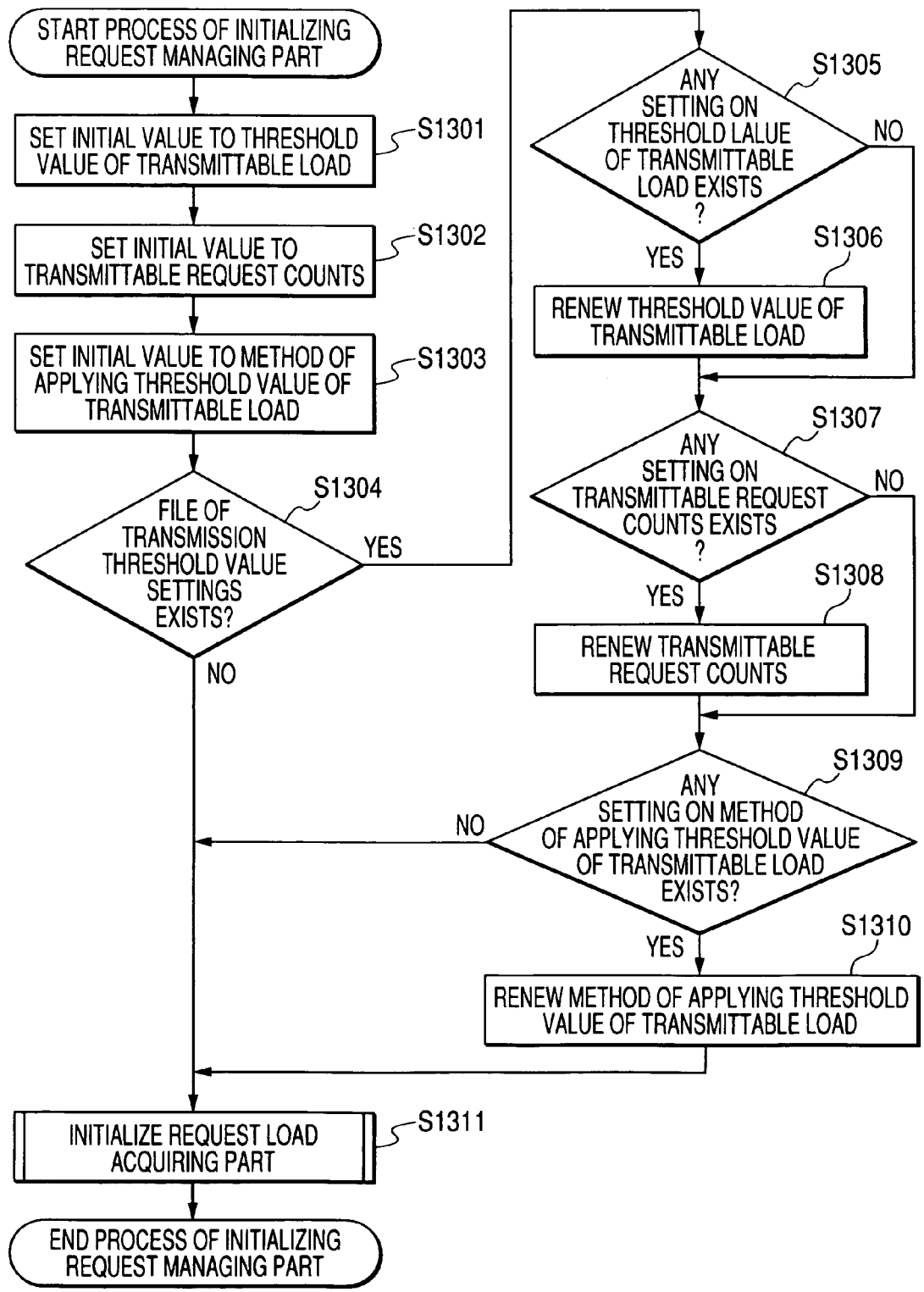
FIG. 13 is a flow chart detailing the initialization process of the managing part having been shown in FIG. 12.
Figure 14:
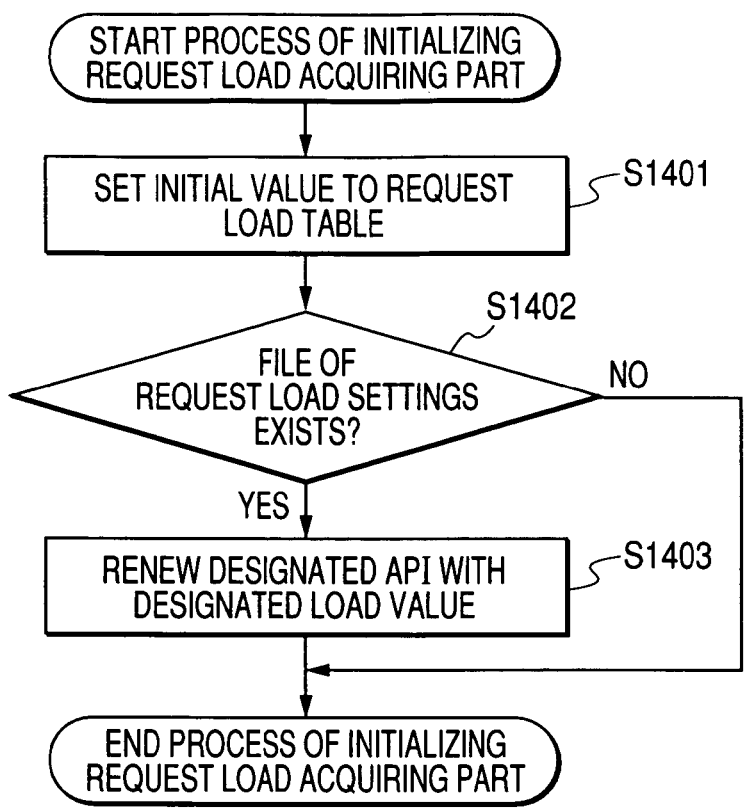
FIG. 14 is a flow chart detailing the initialization process of the request load acquiring part, in the managing part having been shown in FIG. 13.

FIG. 8 is a table exemplifying a request load table 620 in the information processing system to which the present invention is applied, and is used for recognizing respective loads on a plurality of requests, on calculation of load total counts (also called as total loads). The present table is read into RAM 202 from the hard disk 205 in a program initialization process to be described later (FIG. 12 to FIG. 14). The request load table 620 in the present invention is capable of defining a load value on each api (command), and can set a default value as a whole.

According to FIG. 8, the default is 1 point and the Subscribe Event api (numbered 1) 801 instructing subscription of request for an event is defined as 2 points. The List Jobs api (numbered 3) 803 acquiring status as well attributes of a plurality of jobs respectively or collectively bears high loads and therefore is defined as 10 points, and Unsubscribe Event api (numbered 2) 802 for canceling or halting a request for an event is defined as 0 point. Processing the Unsubscribe Event api (numbered 2) 802 gives rise to an effect that the print server will not have to notify an event, and therefore the request load is defined as 0 point. In addition, the response process of the print server on requests will be reduced and therefore, in the case where a request being an object for cancel of the Unsubscribe Event api (numbered 2) 802 is implemented, the value of the size of recognized load multiplied by minus 1 may be regarded as the size of the load for the Unsubscribe Event api (numbered 2) 802.

The request load acquiring part 602 receives a request for acquiring load with the api number as argument from the request managing part 601, and then shall implement searching and recognition of the table defined in FIG. 8, and if a corresponding api number exists, respond with the load value thereof, and if no corresponding number exists, respond with 1 point defined by the default.

Comprising this function (configuration) in FIG. 8, a client takes loads on respective requests into consideration to implement calculation of total loads of an issued plurality of requests, and therefore an appropriate load assessment on requests can be implemented, compared with a mode of a print server to determine only from request counts whether or not to accept a request from a client.

For example, there is a sizable difference in loads born by the print server between registration of an event of print job finalization notice and a request for a list of a plurality of print jobs managed by a print apparatus, and in such a case, loads can be assessed appropriately.

FIG. 9 is a table exemplifying transmission threshold value information 630. The present table is read into RAM 202 from the hard disk 205 in a program initialization process to be described later (FIG. 12 to FIG. 13).

As the transmission threshold value information in the present invention, a transmittable request counts 631, a threshold value of transmittable load 632 and method of application thereof 633 can be designated. These values will be referred to in the request transmission process to be described in FIG. 14. Here, in the case where 0 is designated respectively to the transmittable request counts 631 and the threshold value of transmittable load 632, individual values thereof will not be applied. That is, in the case where 0Request is designated to the transmittable request counts and threshold value of transmittable load 632, transmission control based on post-transmission request counts is not implemented but only control based on load values is implemented.

In addition, there are two methods in the method of applying threshold value of transmittable load, that is, a method of "halting so as not to exceed threshold value" and a method of "halting once reaching threshold value or more" in terms of the load total counts being the sum of respective post-transmission request loads, and FIG. 9 presents an appearance where the method of "halting once reaching threshold value or more" is selected as the current settings. In addition, as for the interpretation on not less than the threshold value and not more than threshold value, either the interpretation that the request transmission is halted at the same value as the threshold value or the interpretation that the request transmission is halted in the case where the total loads get higher or lower than the threshold value will do.

As for the method of "halting so as not to exceed threshold value", in the case the summed value of total loads of post-transmission and response pre-reception request and the load value of pre-transmission request already issued and to be transmitted now exceeds the set threshold value of transmittable load 632, transmission of that request will not be allowed. In addition, as for the method of "halting once reaching threshold value or more", regardless of load value of a request to be transmitted now, if the current load value is nor less than the value of the threshold value of transmittable load 632, no new request transmission will be implemented.

Comprising the both of these configurations in FIG. 9 and the above described FIG. 8, particular effects of, for example, enabling a plurality of cases of registration of print job finalization notifying event, enabling assurance to each client on the operation that only one request for a list of print jobs is allowed and enabling not only appropriate assessment of loads of the print server but also security of constant usability of the printing system in each client will become obtainable in terms of usability as well.

FIG. 10 exemplifies a request list managed in the request managing table 610 at a certain point of time. As can be seen in the drawing, 6 requests exist and two requests of RequestID 100 and 101 have already been transferred to the server, and 4 requests of RequestID 102, 103, 104 and 105 are waiting for transfer. Based on this table shown in FIG. 19, respective loads of a plurality of requests already issued from the client but left with no response from the print server are recognized, the total load of a plurality of requests is calculated based on the recognized respective loads and issuance of requests is restrained at the client side based on the calculated total loads.

The request managing table 610 manages information to become necessary for preparing a message to be transferred to the server (FIG. 7) and values of loads in respective requests in addition to status of respective requests. Here, in the embodiment of the present invention, it is assumed that the load of request is determined every time of accepting a request and the entry is added to the managing table, but such a configuration may be adopted that, without providing the request managing table 610 in FIG. 10 with load values but making direct reference to the request load table 620 shown in FIG. 8, the total load of the post-transmission requests is calculated.

Figure 11:
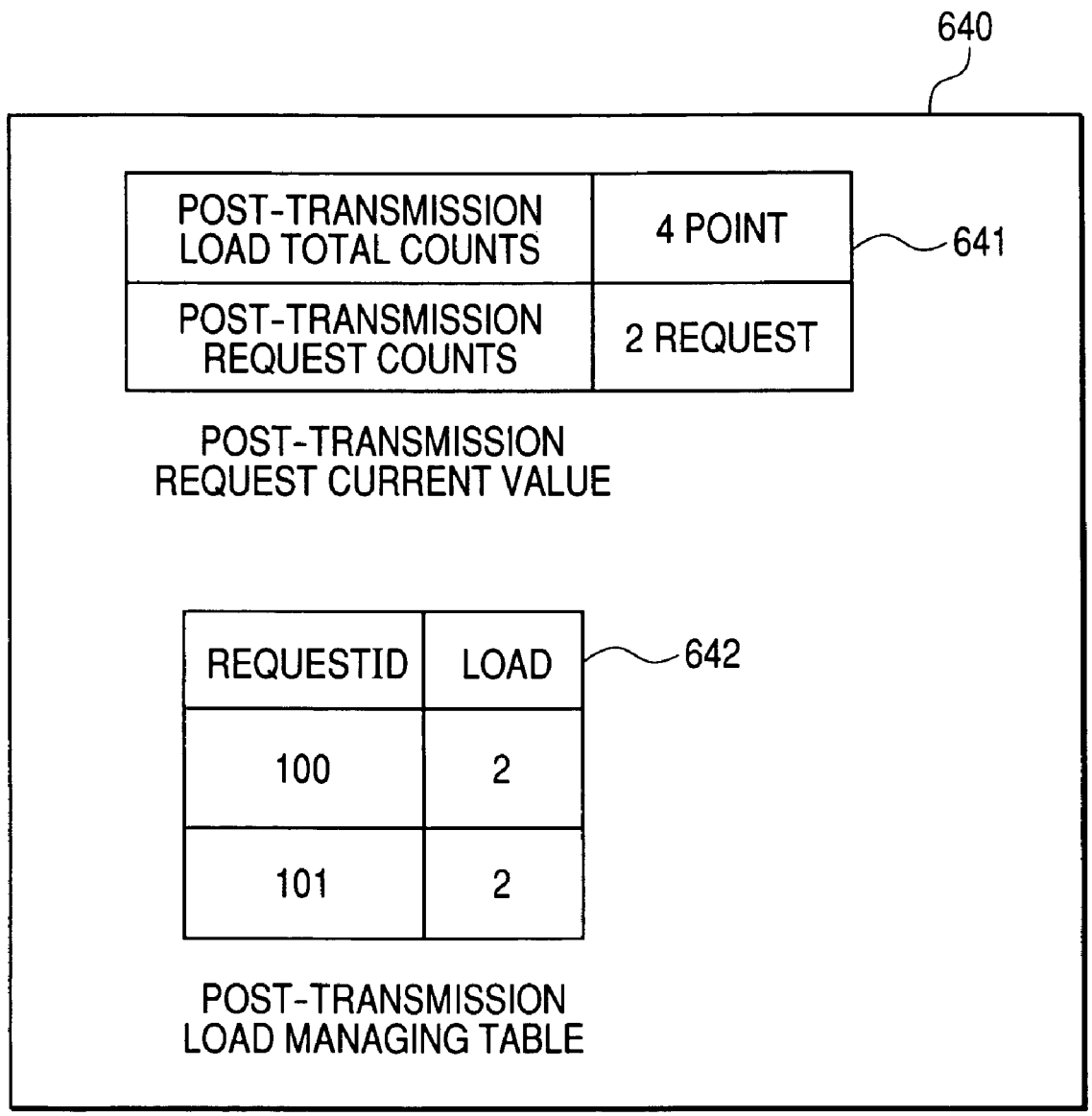
FIG. 11 is a set of tables exemplifying the post-transmission request information 640 having been shown in FIGS. 6A and 6B.

In addition, the request managing table 610 shown in FIG. 10 enables management of requests already transmitted to the print server and requests waiting for transmission in an identifiable fashion, and enables calculation of more accurate load total counts based on requests already transmitted and waiting for response except requests waiting for transmission, as shown in FIG. 11.

FIG. 11 is a set of tables exemplifying the post-transmission request information 640 at the same timing as in FIG. 10. Two requests of RequestID 100 and 101 are recorded in the post-transmission load managing table 642 together with their load values. In addition, in order to simplify calculation, total counts of requests and total loads of those requests included in post-transmission load managing table 642 are kept as the post-transmission request current value 641.

The post-transmission load managing table 642 shows that there are entries of RequestID 100 and 101, therefore making 2 Request of the post-transmission request counts of the post-transmission request current value 641 and making 4 points of post-transmission load total counts. These data are renewed by the request transmitting process, the response receiving process and the request canceling process to be described later.

FIG. 12 is a flow chart showing a schematic operation of a request controlling program in the information processing system in the present invention. Here, since the present flow chart extracts only portions related to the points of the present invention, it goes without saying that inclusion of any not shown process will fulfill the present invention and applicable.

At first, the step S1201 implements the process of initializing the request managing part 601. This will be described later with reference to FIG. 13 and FIG. 14.

In the subsequent steps S1202 and S1203, the request transmitting part 603 and the response receiving part 604 are initialized and the step moves to the step S1204, entering the loop of waiting for an event.

In the step S1205, in receipt of an event of program finalization, the present program comes to an end. On the other hand, in the case where the inputted event is determined to be other than "finalization" in the determination by the request managing part 601 of the step S1205, the request managing part 601 determines in the step S1206 whether or not that event is an event of accepting the request for transmission. In case of determination of "YES", the step S1207 implements process of accepting the request to be described later (FIG. 15) and moves to the step S1204 of waiting for an event.

On the other hand, in the case where the determination in the step S1206 turns out to be the determination of "NO", in the step S1208 the request managing part 601 determines whether or not the event is a request for cancellation. In case of determination of "YES", cancellation process of the step S1209 (FIG. 12) is implemented and the step moves to the step S1213.

On the other hand, in the case where the determination in the step S1208 turns out to be the determination of "NO", the step S1210 determines whether or not the event is a response receiving event (corresponding with the step S1807 in FIG. 18) from the response receiving part 604. In case of "NO", the step jumps to the step S1213. In case of "YES", the message in receipt undergoes determination whether "response" or "event", and in case of "response" and a request for not transiting to "waiting for an event", the step S1211 deletes the entry of the applicable request from the request managing table having been shown in FIG. 10, and subsequently the step S1212 implements the other processes on the response.

The other process included, for example, renewal of GUI, transmission to a response to the superior system, renewing process of internal data managed by the information processing system of the present invention and not related to the present invention and the like.

Subsequently, the step S1213 determines whether or not pre-transmission request exists. In case of "YES", since four pre-transmission requests (RequestID 102 to 105) exist in FIG. 10 specifically, the subsequent step S1214 implements issuance of request from a client, that is, the request transmitting process via the request transmitting part 603. The request transmitting process will be described later with reference to FIGS. 16A and 16B.

Here, the timing for execution of the step S1214 is in case of the step S1213 resulting that a pre-transmission request exists in managed information shown in FIG. 10, but without being limited hereto, regardless of input of events, the flow chart shown in FIG. 12 may be arranged to be executed regularly.

FIG. 13 is a flow chart showing the initializing process of the request managing part 601 and corresponds with the step S1201 in FIG. 12. The initializing process of the request managing part 601 initializes the request managing table 610 as well as the post-transmission request information 640 and prepares the transmission threshold value information 630.

At first, the step 1301 sets the initial value to the threshold value of transmittable load 632. Subsequently, the step S1302 sets the initial value to the transmittable request counts 631.

Subsequently, the initial value for the method of applying threshold value of transmittable load 633 is set. Subsequently, the step S1304 determines whether or not a file of transmission threshold value settings exists. In case of determination of "YES", the step S1305 determines whether or not a setting on the threshold value of transmittable load 632 exists. In case of determination of "YES", the step S1306 renews (changes) the threshold value of transmittable load 632.

Subsequently, the step S1307 determines whether or not any setting on transmittable request counts 631 exists. In case of determination of "YES", the step S1308 renews the transmittable request counts 631 and changes the size of loads corresponding with each request as having been described in FIG. 8.

Subsequently, the step S1309 determines whether or not any setting on the method of applying threshold value of transmittable load 633 exists. In case of "YES", the step S1310 renews (changes) the method of applying threshold value of transmittable load 633. Subsequently the steps S1311 initializes the request load acquiring part 602 and the initialization process of the request managing part comes to an end.

Execution of the flow chart in FIG. 13 enables changes in settings related to conditions of restrains-on transmission of requests (threshold value of transmittable load, transmittable request counts and the like), and enables changes in conditions so as to make it difficult to restrain requests from such a client who tends to issue a great number of respective kinds of requests starting with introduction of a print job compared with other clients. In addition, as a condition of restraint, such a case is assumed that includes any one of or a plurality of the transmittable request counts 631 to the method of applying threshold value of transmittable load 633 as described in FIG. 9.

FIG. 14 is a flow chart of the request load acquiring part 602, and corresponds with the step S1311 in FIG. 13. In the initializing process of the request load acquiring part 602, the request load table 620 is prepared.

At first, the step 1401 sets the initial value to the request load table. Subsequently, the step S1402 determines whether or not a file of request load settings exists, and in case of determination of "YES", the step S1403 renews (changes) the API designated by the file with the designated load value, and the initializing process of the request load acquiring part 602 comes to an end. Here, any type of API designated by the file shall be designatable.

This process in FIG. 14 enables change in sizes of loads corresponding with respective requests, and therefore in the case where the size of a load on a request (API) is inappropriate for the operation of an actual printing system, the size can be changed appropriately, making better printing environments realizable.

Figure 15:
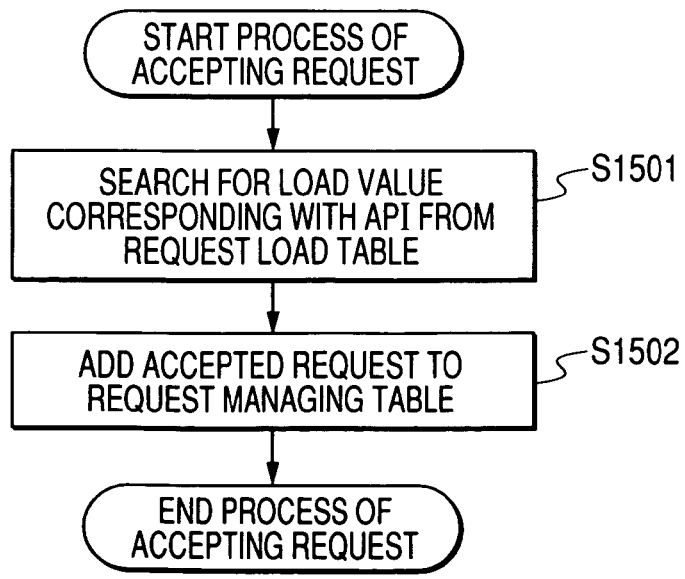
FIG. 15 is a flow chart detailing request reception process having been shown in FIG. 12.

FIG. 15 outlines a request reception process and corresponds with the step S1207 in FIG. 12. When a request transmitting event occurs in accordance with instruction of a user via the print manager 657 or internal application instruction, the step S1501 acquires a load value corresponding with the API from the request load acquiring part 602 and the subsequent step S1502 prepares an entry specifying the request so that the entry is added to the above described request managing table 610 (FIG. 10).

Figure 16B:
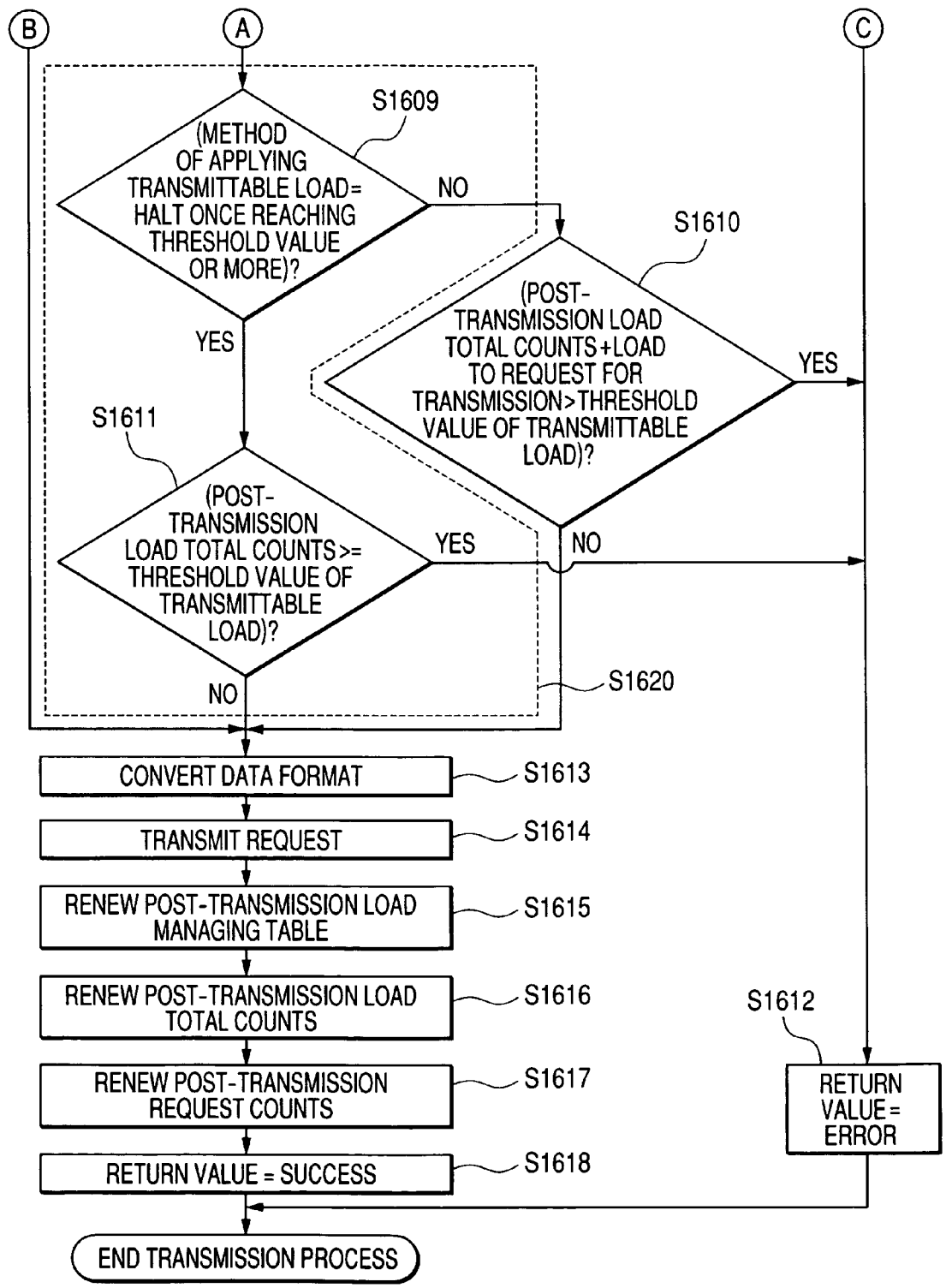
FIG. 16 which is composed of FIGS. 16A and 16B are flow charts detailing request transmitting process having been shown in FIG. 12.

FIGS. 16A and 16B are flow charts detailing the request transmitting process and corresponds with the step S1214 in FIG. 12. Here, details will be described in the assumption that an entry of RequestID 102 in the request managing table 610 is transmitted.

In the request transmitting process, at first the step S1601 inputs information on the request for transmission (the top request under pre-transmission in FIG. 10 is taken out). The step S1601 will input various requests having been described in FIG. 8 (the top request under pre-transmission in FIG. 10 is taken out), but in the drawing, in order to make the description easy to understand, the description will be made as follows in the assumption that load value=10, api=3 and Parameter= (Start=1, Count=100) are inputted (the top request under pre-transmission in FIG. 10 is taken out).

The subsequent step S1602 acquires transmittable request counts 631 in the transmission threshold value information 630. The subsequent step S1603 acquires the threshold value of transmittable load 632 and the method of applying threshold value of transmittable load 633.

The subsequent step S1604 determines whether or not the transmittable request counts is 0 or more.

Here, in case of "NO", determination on the transmittable request counts will not be implemented and the step jumps to the step S1607.

In the case where the determination in the step S1604 turns out to be the determination of "YES", the step S1605 acquires the post-transmission request current value 641 (2 Request in FIG. 11). In the case where the determination in the step S1606 turns out to be the determination the post-transmission and response pre-reception request counts are not less than the transmittable request counts, the transmission process is not implemented, and the step S1612 prepares an error response, and the transmission process comes to an end.

On the other hand, in the case where determination on transmission counts was not implemented, or in the case where determination on transmission counts a result of the determination being "OK", the step S1607 determines whether or not the threshold value of transmittable load 632 is larger than 0. In case of 0 or less, determination based on load will not be implemented, and the transmission process described in the steps S613 to S1618 will be implemented. A mode that does not take load into consideration can serve a user, such as a manager, who has necessity for issuing a great number of requests.

In the case where the determination in the step S1607 turns out to be the determination of "YES", the step S1608 acquires the post-transmission load total counts 641 (4 Point in FIG. 11). Here, determination on the load total counts 641 and the threshold value of transmittable load 632 is different in accordance with the method of applying threshold value of transmittable load 633, but in any case, respective loads of a plurality of requests that are already transmitted from the client and waiting for response from the print server can be recognized with the transmission threshold value information 630 in FIG. 9, and the calculated results based on the recognized respective loads will become the load total counts acquired by the step S1608.

In the case where the step S1609 does not select "halt once reaching threshold value or more" by the method of applying threshold value of transmittable load 633, the step S1610 determines whether or not the sum of the post-transmission load total counts 641 (4 points) and the load of the request to be transmitted now (10 points in the step S1601 is larger than the threshold value of transmittable load 632 (12 points in FIG. 10). In the case where the determination turns out to be larger, the step transits to the step S1612 and the transmission process is not implemented.

On the other hand, in the case where the step S1609 has come up with determination of "YES", the step S1611 determines whether or not the total load counts 641 that are given by requests that are already transmitted and waiting for response from the print server is not less than or exceeds the threshold value of transmittable load 632, and in case of "NO", the step transits to the step S1612 and the transmission process is not implemented.

In the case where a result of the above described determination is determined to fulfill transmittable conditions, the actual transmission process is implemented. Here, determination of the step S1609 may be omitted so that the step moves to the step S1611 without implementing determination in the step S1608 through the step S1609.

The step S1613 implements data format conversion, and a data stream is converted into the network format having been shown in FIG. 7 from the host format. The subsequent step S1614 issues request message onto the network via the request transmitting part 603.

The subsequent step S1615 renews the post-transmission load managing table 640 and adds an entry. Subsequently, the steps S1616 and S1617 renew the post-transmission request current value 641 while the step S1618 responds with "success" and the transmission process comes to an end. When the transmission process comes to an end, the status of the request in the request managing table 610 transits from "Wait" to "Sent".

The flow charts in FIGS. 16A and 16B can alleviate determination process load at the print server side, compared with a mode of a print server to determine whether or not to accept a request from a client. In particular, in the case where the print server is co-owned by a plurality of clients, such an effect becomes attainable that the determination process for permission on issuance of requests from clients is deconcentrated.

Moreover, with a mode of a print server to determine whether or not to accept a request from a client, in case of refusing a request, not only the determination process load of the print server increases but also notification of refusal from the print server to the clients as well as retrial of issuance of request from clients linked to receipt of the refusal will be brought about, giving rise to a problem that the traffic quantity will be caused to increase, but the flow charts in FIGS. 16A and 16B can eliminate this problem.

Figure 17:
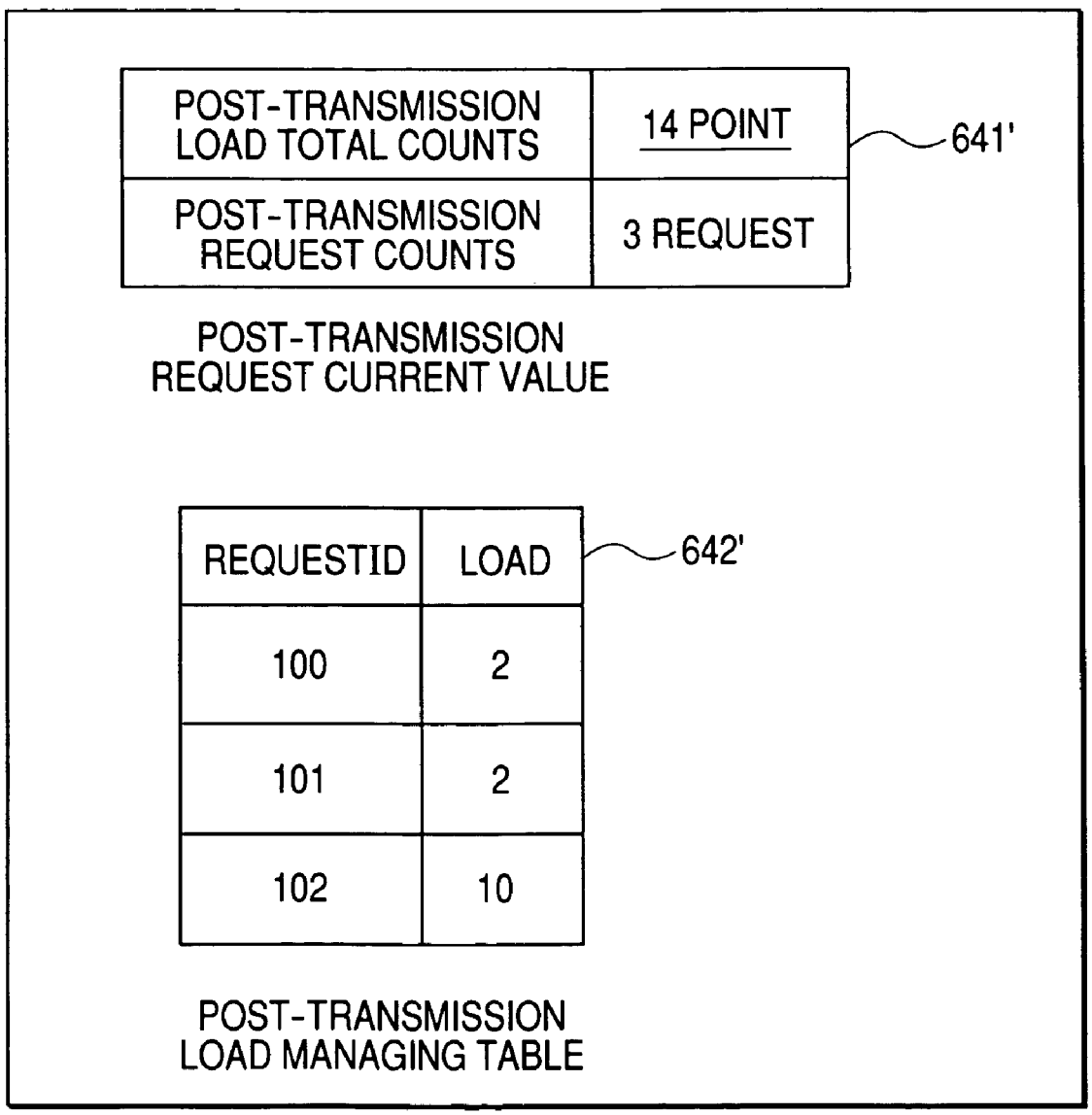
FIG. 17 is a set of tables exemplifying the post-transmission request information 640 subject to execution of request transmitting process having been shown in FIGS. 16A and 16B.

FIG. 17 shows how the post-transmission request information 640 changes after finalization of the request transmission process. Compared with FIG. 10, the post-transmission load total counts in the post-transmission request current value 641' are 14 Point (increase of 10 Point), the post-transmission request counts are 3 Request (increase of 1 Request) and an entry of RequestID 102 is added to the post-transmission load managing table 642'.

Figure 18:
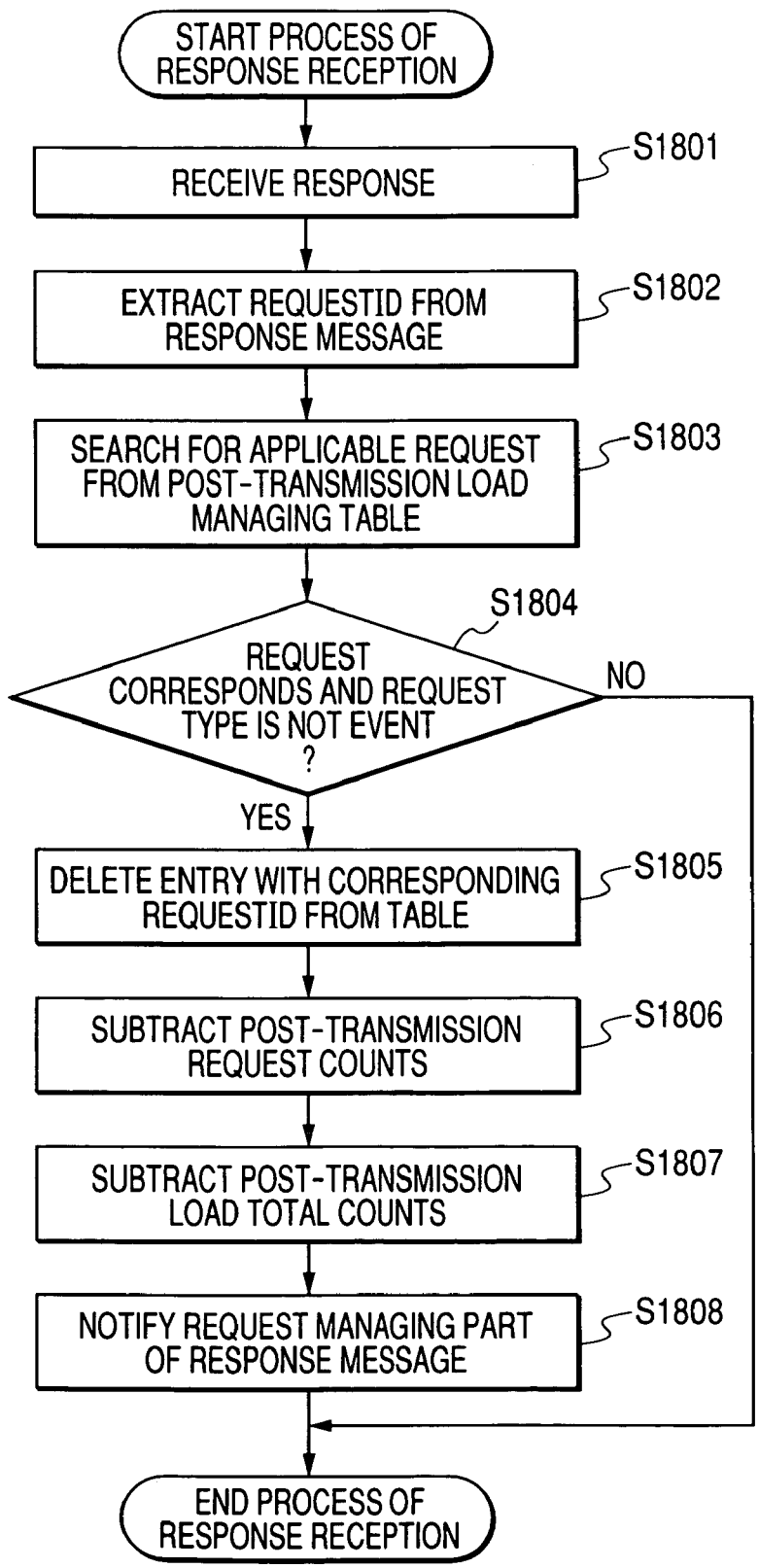
FIG. 18 is a flow chart showing the process of response receiving part 604 having been shown in FIGS. 6A and 6B.

FIG. 18 is a flow chart showing an outline of process of response reception in the response receiving part 604. Details of process of the step S1211 as well as the step S1212 having been described in FIG. 12 will be shown.

In receipt of a message (the structure is described in FIG. 7) transmitted from the print server 101 in the step S1801, the step S1802 extracts RequestID from the message, and the step S1803 searches the post-transmission load table 642 based on the extracted RequestID.

In the case where the step S1804 has searched a corresponding request and the request is not an event type (a type of request to receive, in an asynchronized fashion, event message once or more times other than the response from the server), the step S1805 deletes the searched table from the post-transmission load managing table 642 and renews the load managing table 642.

Subsequently, the step S1806 and the step S1807 subtract only the value corresponding with the deleted table from the post-transmission request counts and the post-transmission load total counts in post-transmission request current value, and renew the post-transmission request current value 641 as well. Thus, the process of the steps S1806 and S1807 can subtract loads corresponding with the requests to which the print server has responded from the load total counts.

Subsequently, the step S1808 notifies the request managing part 601 of a response receiving event.

In addition, execution of the flow chart in FIG. 18 gives rise to from the case where the calculated load total counts are not less than a predetermined threshold value or higher than the threshold value to the case of less than the threshold value or not more than the threshold value (the steps S1610 and S1611 determines as "NO"), and in that case, transmission of request restrained under pre-transmission (retransmission) is implemented by the request transmitting part 603 (the step S1614). And then the pre-transmission requests subscribed at the client side will be sequentially sent to the print server 101.

Figure 19:
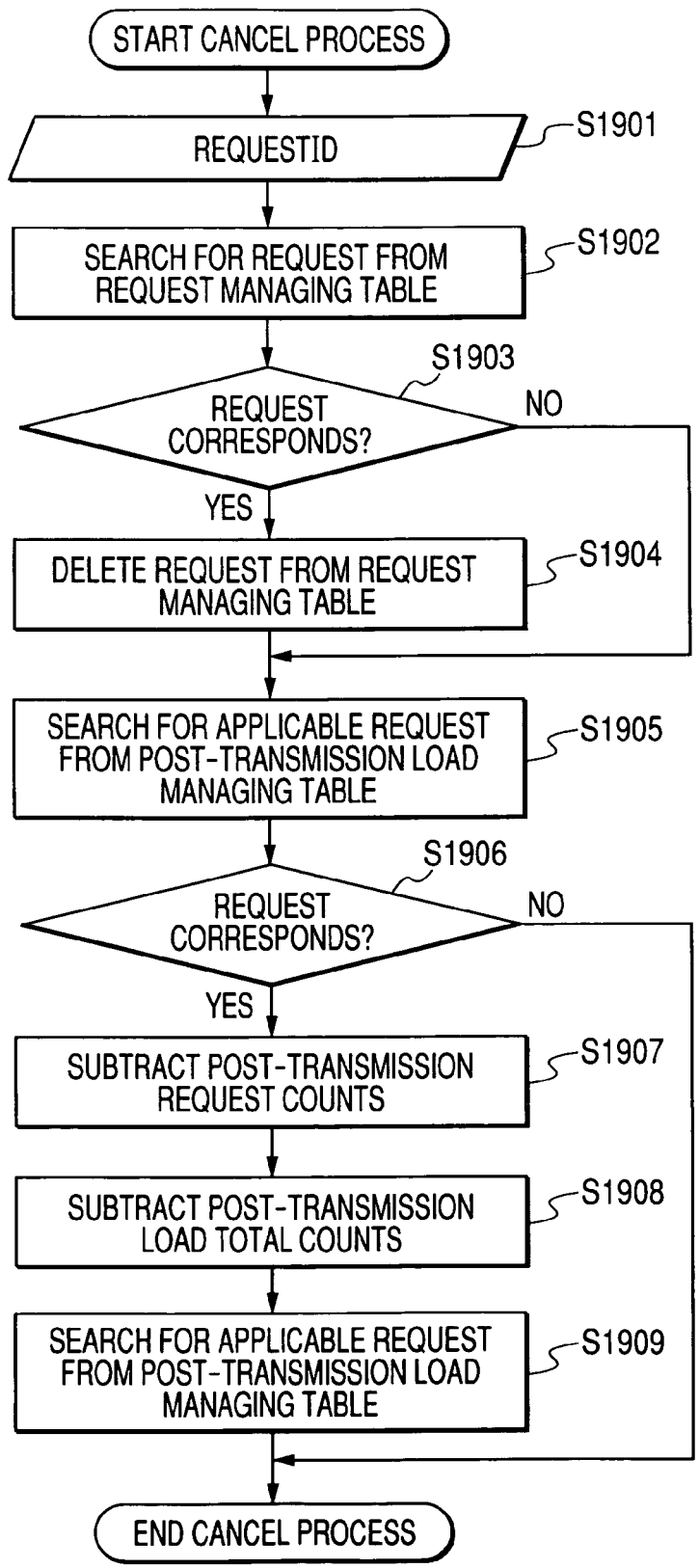
FIG. 19 is a flow chart detailing the request canceling process having been shown in FIG. 12.

FIG. 19 is a flow chart detailing the process of canceling request transmission from a client to the server, and corresponds with the step S1209 in FIG. 12.

At first, the step S1910 inputs an ID (Request ID) for identifying a request to be cancelled. Subsequently, the step S1902 searches the request managing table 610 for the applicable request.

In the case where the step S1903 determines that a corresponding request exits, the step 1904 deletes the applicable request from the request managing table 610. Subsequently, the post-transmission request information 640 is renewed. In addition, in case of having deleted the request from the request managing table 610, correspondingly an order for deleting the request already transmitted from the client to the printer side (for example, UnsubscribeEvent api (number 2) or cancel request) is transmitted so as to alleviate loads at the printer side.

The step S1905 searches the post-transmission load table 642 for a table corresponding to the request ID.

In the case where the step S1906 determines that a corresponding table exists, the step S907 subtracts one (1) from the post-transmission load counts of the post-transmission request current value 641. Subsequently, the step S1908 subtracts only the load value of the entry searched in the step S1905 from the post-transmission load total counts of the post-transmission request current value 641.

Subsequently, the step S1909 deletes the applicable request from the post-transmission load table and the cancel process comes to an end.

Embodiment 2

In Embodiment 1, it has been described that the total loads are calculated for requests yet to be responded by the print server 101 among a plurality of requests issued from a client, and in accordance with the calculated total loads, issuance of requests from the client is restrained, but this will not limit any way.

With regard to the point that respective loads are calculated for the requests yet to be responded by the print server 101 among the plurality of requests issued from one client to the print server 101 and, based on the recognized respective loads, the total loads of the request are calculated, it may be implemented by the print server or another apparatus.

That is, such a mode that the print server 101 comprises the functions described in FIGS. 6A and 6B and FIG. 8 of Example 1, moreover supervises and manages the functions described in FIG. 9, FIG. 10, FIG. 11 and FIG. 17 corresponding with each client being the source of request issuance and moreover executes process of flow charts in FIG. 15, FIGS. 16A and 16B, FIG. 18 and FIG. 19 can be assumed. In case of this mode, the respective flow charts in FIG. 15, FIGS. 16A and 16B and FIG. 18 will be implemented to each client individually. In addition, the process of the step S1614 in FIGS. 16A and 16B is realized by replacement with the process of the print server 101 to receive requests from a client In addition, also in this Embodiment 2, taking loads on respective requests into consideration to implement calculation of total loads of an issued plurality of requests, and therefore an appropriate load assessment of individual apparatus on requests can be implemented, compared with a mode to determine only from request counts whether or not to accept a request from a client.

For example, in the aspect that there is a sizable difference in loads born by the print server between registration of an event of print job finalization notice and a request for a list of a plurality of print jobs managed by a printer, and in such a case, loads can be assessed appropriately, making particular effects likewise Example 1 attainable as well.

This application claims priority from Japanese Patent Application No. 2004-221837 filed Jul. 29, 2004, which is hereby incorporated by reference herein.

What is claimed is:

1. A print controlling program stored on a computer-readable storage medium such that, when executed by a computer, said program causes the computer to execute a method carried out in an information processing apparatus having an issuing unit for issuing a request for a process to a print controlling apparatus, the method comprising:
   recognizing a load for each of a plurality of requests that have been issued from the information processing apparatus but have received no response from the print controlling apparatus;
   calculating a total load of the recognized loads for the plurality of requests; and
   halting issuance of requests from the information processing apparatus based on the calculated total load.

2. A program according to claim 1, wherein said halting step halts transmission of requests to the print controlling apparatus if the calculated total load in said calculation step is equal to or greater than a predetermined threshold value.

3. A program according to claim 1, wherein the method further comprises a subtraction step of subtracting a load corresponding with a request responded from the print controlling apparatus from the calculated total load.

4. A program according to claim 3, wherein the method further comprises a request transmitting step of transmitting a request halted under pre-transmission if the calculated total load in said calculation step changes from a value equal to or greater than a predetermined threshold value to a value equal to or less than the predetermined threshold value due to a subtraction in said subtraction step.

5. A program according to claim 1, wherein the method further comprises a request managing step of managing management information by which requests already transmitted to the print controlling apparatus and requests waiting for transmission to the print controlling apparatus can be distinguished from each other, and wherein said recognizing step recognizes the loads based on the requests already transmitted except the requests waiting for transmission managed in said request managing step.

6. A program according to claim 1, wherein the method further comprises a changing step of changing the size of a load corresponding with each request.

7. A program according to claim 1, wherein the method further comprises a changing step of changing a condition of the halt in said halting step.

8. A method carried out in an information processing apparatus having an issuing unit for issuing a request for a process to a print controlling apparatus, said method comprising:

recognizing a load for each of a plurality of requests that have been issued from the information processing apparatus but have received no response from the print controlling apparatus;

calculating a total load of the recognized loads of the plurality of requests; and halting issuance of requests from the information processing apparatus based on the calculated total load.

9. A computer-readable storage medium for storing a print controlling program that causes a computer to execute a method carried out in an information processing apparatus having an issuing unit for issuing a request for a process to a print controlling apparatus, the method comprising:

recognizing a load for each of a plurality of requests that have been issued from the information processing apparatus but have received no response from the print controlling apparatus;

calculating a total load of the recognized loads for the plurality of requests; and halting issuance of requests from the information processing apparatus based on the calculated total load.

10. An information processing apparatus having an issuing unit for issuing a request for a process to a print controlling apparatus, comprising:

a recognizing unit adapted to recognize a load for each of a plurality of requests that have been issued from said information processing apparatus but have received no response from the print controlling apparatus;

a calculation unit adapted to calculate a total load of the recognized loads for the plurality of requests; and a halting unit adapted to halt issuance of requests from said information processing apparatus based on the total load calculated by said calculation unit.

* * * * *